United States Patent Office 3,282,454
Patented Nov. 1, 1966

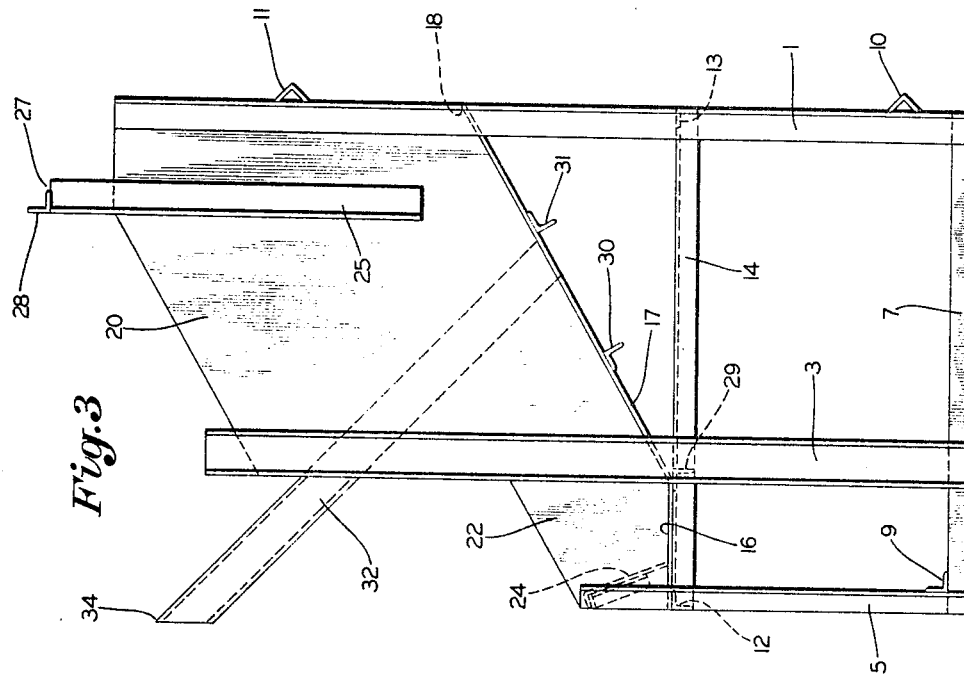
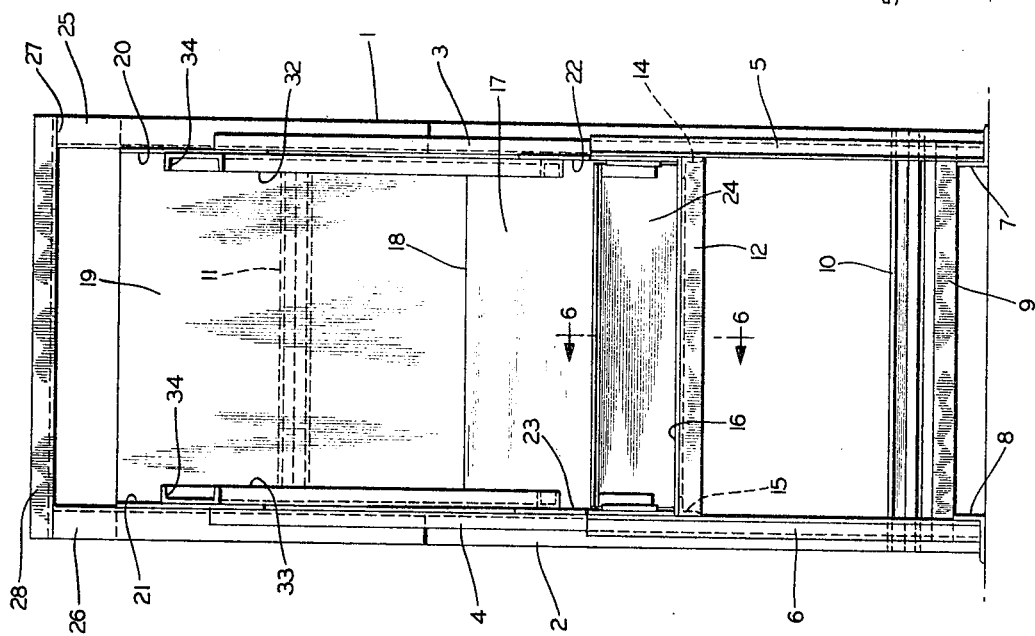

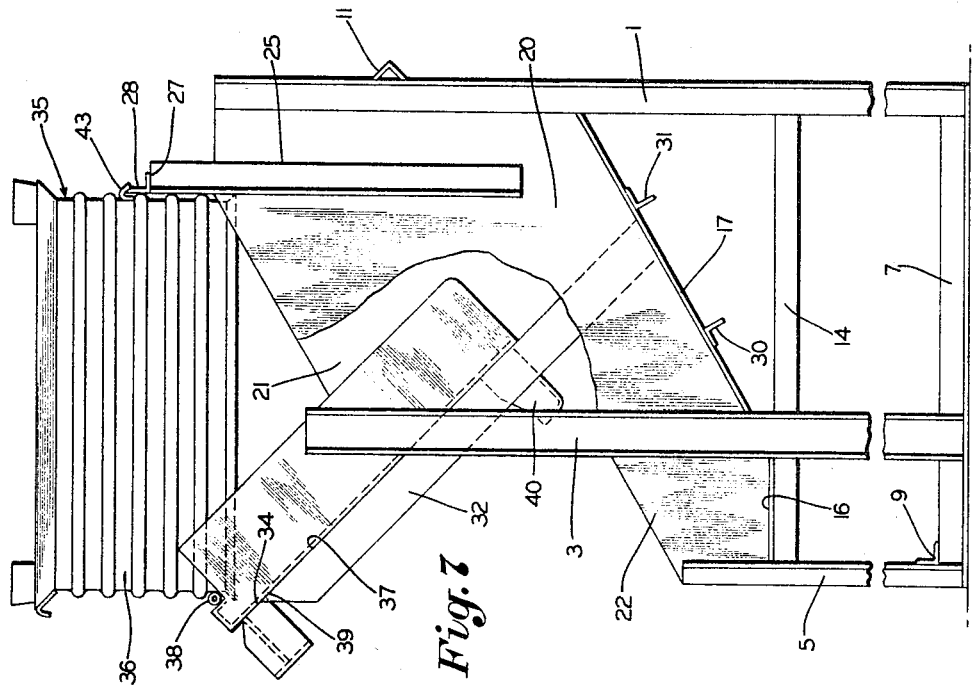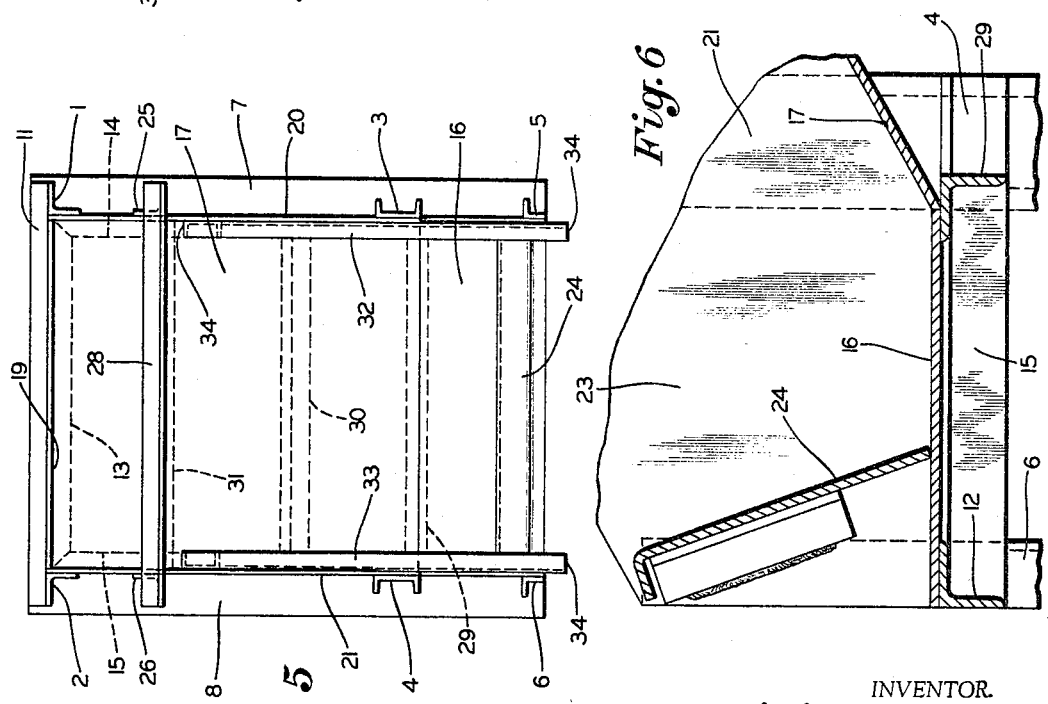

3,282,454
MATERIALS HANDLING REVERSE FLOW
POSITIONING STAND CONSTRUCTION
William A. Ruffing, Pottstown, Pa., assignor to The Union
Metal Manufacturing Company, Canton, Ohio, a corporation of Ohio
Filed July 12, 1965, Ser. No. 471,194
3 Claims. (Cl. 214—302)

The invention relates to materials handling equipment, and more particularly to a positioning stand construction adapted to receive materials in process discharged from a materials handling bottom dump box and to position such materials at a point-of-use work level with no stooping or stretching, which substantially reduces the floor space required for a stand unit and which reduces the number of materials handling dump boxes required to maintain a steady or uninterrupted flow of materials in process.

There has been wide spread use of bottom dump boxes and materials handling equipment such a shown in Patents Nos. 2,445,038 and 2,690,277 for handling materials in process in manufacturing plants, whereby an uninterrupted flow of materials in process is located or positioned and maintained at a convenient level at a point-of-use adjacent a machine or press in a manufacturing plant. Normally, the use of materials handling equipment involves depositing a bottom dump box on a positioning stand by a fork-lift truck. The box is left on the stand and materials flow from the box to the stand slowly as the materials are used in the machine served by the stand until the supply of materials in the box is exhausted. Then the box is removed and replaced by another full box. The empty box on removal may be placed adjacent the machine or press being served by the positioning stand, to receive materials in process produced by such machine or press.

Heretofore, the use of such materials handling equipment has required free or unoccupied floor space adjacent the positioning stand either at one side or at the rear of the stand to accommodate the approach of a fork-lift truck to deposit a full bottom dump box on or to remove an empty box from the stand.

There are many industrial situations, however, where crowded floor, machinery, and aisle conditions in a manufacturing plant do not permit the advantageous use of suitable materials handling equipment because the floor space requirements for locating and supplying each positioning stand cannot be tolerated or because the number of dump boxes required to maintain an uninterrupted flow of materials in process may be greater than capital expenditures permit.

Accordingly, it is a general object of the present invention to provide a new materials handling reverse flow positioning stand construction for receiving materials in process from bottom dump boxes which substantially reduces the floor space required for locating and supplying any positioning stand unit adjacent a press or machine served by the stand, and which stand may be located with its rear against a wall or other obstruction.

Furthermore, it is an object of the present invention to provide a new materials handling reverse flow positioning stand construction for receiving materials in process at a point-of-use from bottom dump boxes or other materials handling containers which substantially reduces the number of boxes or containers required to maintain an uninterrupted flow of materials at a point-of-use location.

Moreover, it is an object of the present invention to provide new materials handling equipment which may be located and used at places and under conditions where it has been impossible to locate or use prior art equipment otherwise of desirable construction.

Finally, it is an object of the present invention to provide new materials handling equipment eliminating difficulties heretofore encountered in the art; serving for delivery of materials in process at locations heretofore impossible to be served by otherwise satisfactory equipment; achieving the stated objects in a simple, effective and inexpensive manner; and solving problems and satisfying needs existing in the art.

These and other objects and advantages, apparent to those skilled in the art from the following description and claims, may be obtained, the stated results achieved, and the described difficulties overcome, by the apparatus, combinations, parts, elements, arrangements, relationships and constructions which comprise the present invention, the nature of which is set forth in the following general statement, a preferred embodiment of which—illustrative of the best mode in which applicant has contemplated applying the principles—is set forth in the following description and shown in the drawings and which are particularly and distinctly pointed out and set forth in the appended claims forming part hereof.

The nature of the improved materials handling reverse flow positioning stand construction and arrangement of the present invention which conserves space and the use of boxes may be stated in general terms as including for use with a bottom dump box unit adapted for storing materials in free-standing or tiered position, for transporting materials from place to place, for dumping materials with a fork-lift truck, and for positioning and discharging materials at a convenient work level and which has front, side, and rear walls forming a rectangular enclosure having a lower opening closed by a hinged bottom wall provided with rear end supports adjacent the hinge connection and a front end support adapted to be engaged by the forks of a fork-lift truck for opening and closing the bottom wall while the box unit is supported on the truck with its bottom wall on the fork, and which box normally is supported for positioning and discharging materials by a front hangar on the box engaged on a support member on the front of a positioning stand with the front and rear box walls respectively adjacent the front and rear of the stand and with the hinged bottom box wall open and forming the hopper bottom of the stand construction to feed or deliver materials in the box downwardly forwardly of the box to the front of the stand, the combination of stand means having side, rear, and slanted-rear-to-front bottom walls forming a hopper provided with a point-of-use tray front, a support member adjacent the rear hopper wall, spaced box support means above the tray front, the support member being engaged by and supporting a front hangar on a dump box unit to hold the box in fixed position when deposited by a fork-lift truck on the stand from the front of the stand, and the spaced box support means being engaged by the rear corners of the box bottom wall adjacent the box rear supports when a lift truck fork supporting such box unit is lowered; whereby when the lift truck fork is lowered the hinged bottom box wall opens downwardly rearwardly of the stand and the contents of the box are discharged by reverse flow into the stand hopper; and whereby the fork of the lift truck then can be raised immediately to close the empty box to disengage support of the box on the rear stand wall, to remove the box from the stand forwardly of the stand, and upon subsequent lowering of the fork to place the box in free-standing position adjacent the stand and the machine served by the stand for receiving materials in process produced on the machine.

By way of example, an embodiment of the improved construction is shown in the accompanying drawings forming part hereof in which:

FIG. 3 is a side view of the stand illustrated in FIGS. 1 and 2;

FIG. 4 is a front view of the stand shown in FIG. 3;

FIG. 5 is a top plan view of the stand shown in FIGS. 3 and 4;

FIG. 6 is an enlarged section looking in the direction of the arrows 6—6, FIG. 4; and FIG. 7 is a view similar to FIG. 3 illustrating a box on the stand and materials flowing from box into the stand hopper.

Similar numerals refer to similar parts throughout the various figures of the drawings.

Figure 1:
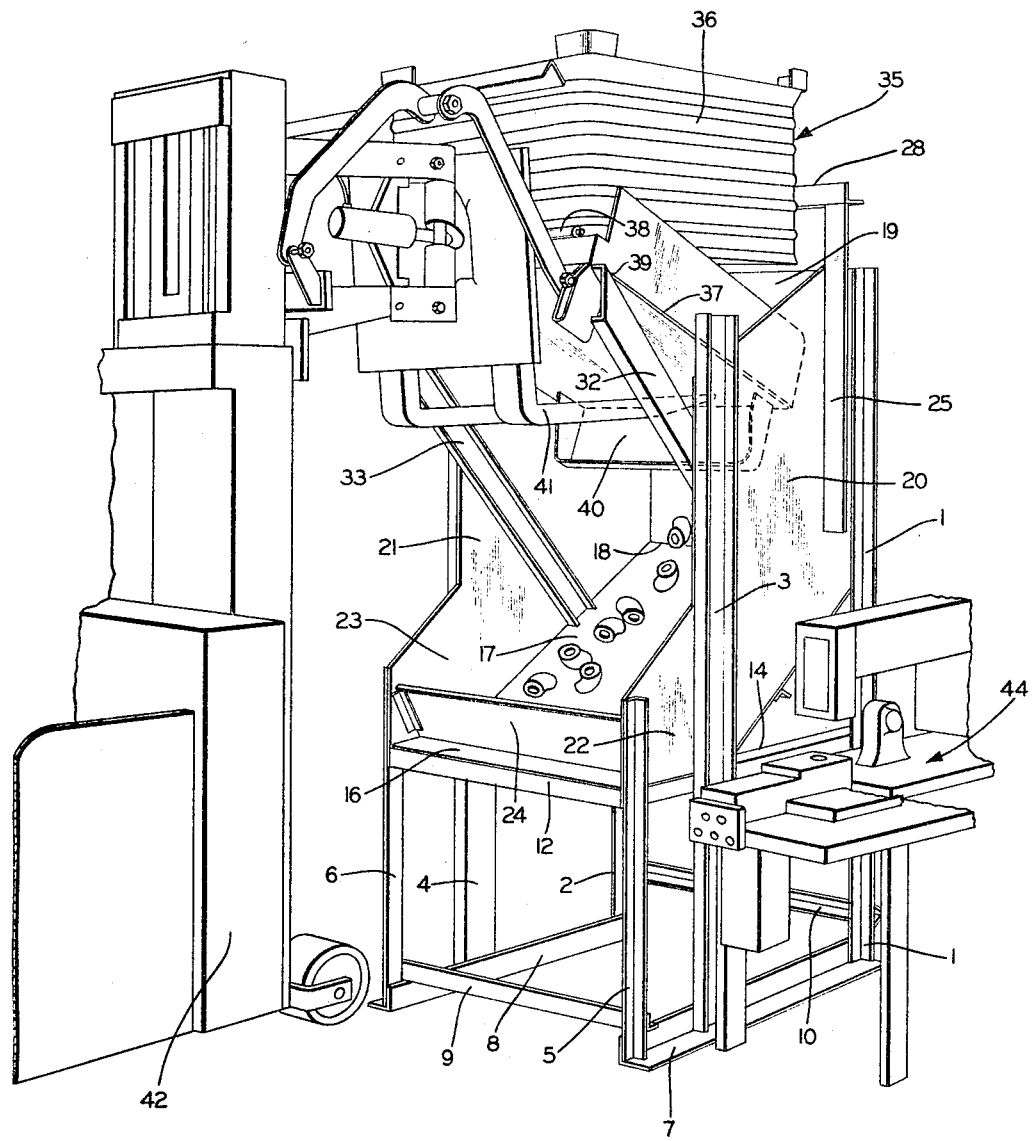
FIGURE 1 is a fragmentary perspective view of the improved positioning stand construction illustrating a fork-lift truck depositing a bottom dump box on the stand from the front of the stand.

The improved construction is illustrated and described herein with particular reference to bottom dump boxes of the general type illustrated in Patents Nos. 2,445,038 and 2,690,277 which are handled, transported, and dumped by a fork-lift truck. However, it is to be understood that the improved positioning stand construction and mode of use also can be supplied with materials in process by other types of materials handling containers.

The improved stand construction preferably includes rear legs 1 and 2, side leg struts 3 and 4 and front corner legs 5 and 6 extending upward from base stringer members 7 and 8 and cross members 9 and 10.

An upper cross member 11 (FIG. 3) joins rear legs 1 and 2 and front and rear platform cross members 12 and 13 extend, respectively, between front legs 5 and 6 and rear legs 1 and 2 at a convenient work positioning level. Intermediate side stringer members 14 and 15 extend between the ends of members 12 and 13 and connect members 1, 3, and 5 and 2, 4, and 6, respectively.

A hopper tray wall 16 is supported on members 12, 14, and 15 and extends between legs 3–5 and legs 4–6 at the front of the stand, the left of FIG. 3. A slanted rear-to-front hopper bottom wall 17 is mounted on the stand extending from the rear edge of tray wall 16 upwardly to the rear legs 1 and 2 at 18. A hopper back wall 19 extends from the rear end 18 of hopper wall 17 upwardly to the tops of legs 1 and 2 and spans the back of the stand. Hopper side walls 20 and 21 extend downwardly from the rear wall 19 and legs 1 and 2 to the leg struts 3 and 4, and hopper side wall extensions 22 and 23 project from legs 3 and 4 to the front legs 5 and 6.

A preferably removable tray front member 24 extends between the hopper side wall extensions 22 and 23.

Struts 25 and 26 extend upwardly adjacent but forwardly of the rear legs 1 and 2, and are mounted on the hopper side walls 20 and 21. Struts 25 and 26 terminate at 27. A preferably angle cross member 28 is mounted on the upper ends 27 of struts 25 and 26.

Tray wall 16 and hopper bottom wall 17 preferably are reinforced by lateral angle members 29, 30, and 31. Channel support members 32 and 33 are mounted, respectively, on hopper side walls 20 and 21 projecting forwardly upwardly so that the upper ends 34 of the support members 32 and 33 form spaced support means located generally directly above the tray front member 24 as shown in FIG. 3.

A bottom dump box indicated generally at 35 is shown in FIG. 7 supported on the improved stand with materials contained in the box flowing reversely from the box into the hopper provided by the stand walls 16, 17, 19, 20, 21, 22, 23 and 24.

The bottom dump box 35 may be of the general type illustrated in Patents Nos. 2,445,038 and 2,690,277. Such boxes include a rectangular enclosure 36 formed by front, side, and rear walls and having a lower opening closed by a bottom wall 37 hinged at 38 to one of the rectangular enclosure walls. The hinged bottom wall 37 is provided with rear end supports 39 mounted on the bottom wall 37 adjacent the hinge connection 38 and spaced from the rear corners of the bottom wall. Bottom wall 37 of box 35 also is provided with a front end support 40.

Box 35 may be used for the storage and transportation of materials and when in free-standing position or tiered, the box rests on the support members 39 and 40. When the box is moved or manipulated on the fork 41 of a fork-lift truck 42, the box bottom wall 37 normally rests on fork 41. The fork 41 engages the box front end support member 40 to manipulate opening and closing movements of the bottom wall 37 while the box is supported on the truck as shown in FIG. 1.

When it is desired to position materials contained in the box 35 at a convenient work level, the contents of the box may be dumped into or flow from the box into the improved positioning stand construction. In accordance with the invention this box dumping is accomplished by approaching the stand with a fork-lift truck 42 from the front of the stand as shown in FIG. 1. The box 35 is raised on the truck 42 to a level above the top of the stand. The truck then may be moved toward the front of the stand so as to locate the box 35 above the stand. Fork 41 then is lowered until hangar member 43 on the front of the box engages stand across member 28 as shown in FIG. 7. Continued lowering of fork 41 permits box bottom member 37 to open as shown in FIGS. 1 and 7, the rear corners of bottom member 37 meanwhile resting on and being supported by the upper ends 34 of support members 32 and 33.

As soon as the box bottom wall 37 opens, materials in the box flow along the chute formed by the box bottom wall 37 toward the rear of the hopper formed by the stand walls 16, 17, 19, 20, and 21 and then in reverse direction down the slanting hopper bottom wall 17 to the hopper tray wall 16. Thus, the materials are positioned at a convenient level adjacent a point-of-use where a workman may readily reach the material for use in the operation of a machine processing the material such as indicated generally at 44 in FIG. 2.

As soon as the contents of the box has been dumped, the fork-lift truck 42, which meanwhile remains in position adjacent the positioning stand as shown in FIG. 1, may be operated to raise the fork 41, to close the bottom of box 35 and to remove the box from above the stand. Box 35, now empty, if desired then may be placed in free-standing position on the floor as indicated at 45 in FIG. 2 adjacent the machine 44 being supplied with materials from the stand so that when the finished materials in process leave machine 44, they again may be introduced into the box for storage or transportation.

Heretofore, in the use of positioning stands served by boxes and fork-lift trucks of the type illustrated and described, and such as shown in Patent No. 2,690,277, the box bottom served as the chute or hopper for the positioning stand and the box remained on the stand until empty. This required the stand to be approached from the rear in order to deposit a box on the stand with a fork-lift truck.

These requirements have restricted the otherwise desired use of bottom dump boxes and positioning stands for locating materials in process at a convenient level at the point-of-use. Where space has been limited, or where it was required to located the stand against a wall, it was impossible to use the prior arrangement.

The prior arrangement had a further disadvantage in that any box remained on the stand until empty. If a box is used to receive materials in process produced by the machine served by the positioning stand, then two boxes would always be required to be located adjacent any positioning stand and machine served thereby to maintain a proper and uninterrupted flow of materials in process.

In accordance with the invention, however, only one box is required at any one stand or station at any one time. The same box that is dumped, as shown in FIG. 1, serves as a receiving container as shown in FIG. 2.

Figure 2:
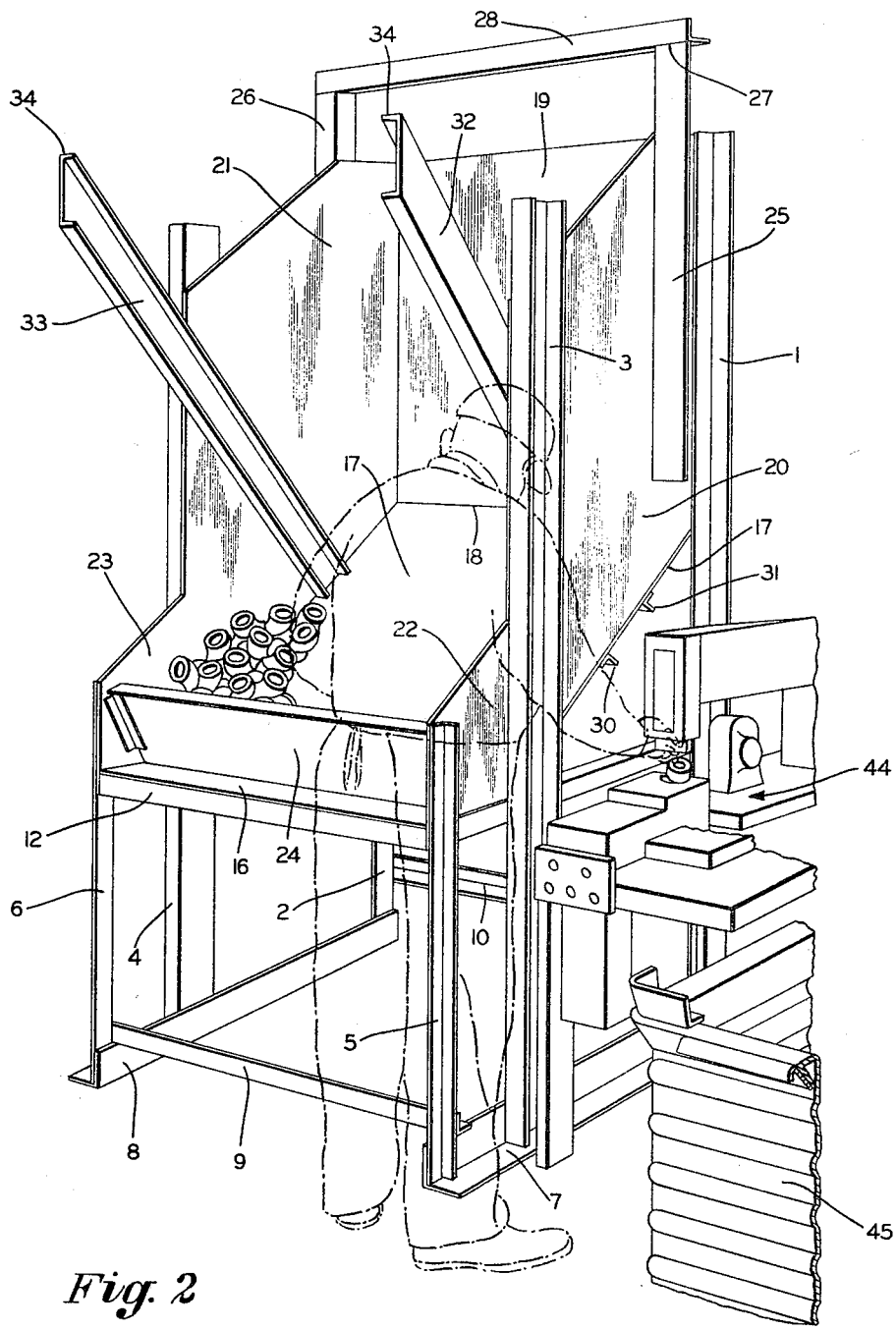
FIG. 2 is a view similar to FIG. 1 showing the box removed and located adjacent a machine being supplied with parts from the stand.

Further, this all may be accomplished in accordance with the invention even when the back of the stand is located against a building wall as shown in FIGS. 1 and 2. The spacing of the cross member 28 on the stand offset forwardly of the rear hopper wall 19 and the provision of an opening between the hopper side walls 20 and 21 and support members 32 and 33 permit a box 35 to be moved to a position over the stand and lowered, from a front approach to the stand. The offset located across member 28 adjacent the rear of the stand, however, engages and supports the hanger members 43 on the front of the box 35 with a sufficient space present between the front of the box and the rear stand hopper wall 19 that the box contents can flow from the box into the hopper when the bottom wall 37 is opened. All of this, also, may be accomplished without spilling the contents of the box onto areas adjacent the stand.

As shown in FIGS. 1 and 7, notwithstanding that the rear corners of the hinged box bottom wall 37 adjacent the hinged connection 38 are supported on the spaced support member means 32 and 33 as the box is dumped, the bottom wall 37 on the box 35 swings downwardly within the confines of the stand hopper walls 19, 20, and 21 to avoid spillage.

In this manner the improved positioning stand construction may be used and integrated in materials handling systems in plants equipped with boxes of the type illustrated, and the improved positioning stands may be located in cramped quarters where heretofore it was impossible to install or use such materials handling equipment. Further, the conservation of space and of the use of boxes, or the reduction in the number of boxes required reduces overall materials handling costs.

Accordingly, the improved construction of the present invention provides for the fast, safe, and positive handling by fork-lift truck equipment of materials handling dumping boxes to position production parts convenient to an operator at a machine with reduced space requirements and reduced container requirements as compared with prior practice; provides a construction which is simple, practical, and low in cost; provides a construction which facilitates production layouts in modern plants and facilitates the use of bottom dump boxes such as shown in Patents Nos. 2,445,038 and 2,690,277; provides a solution to problems which have existed in the art; and eliminates difficulties heretofore encountered in the art, thereby achieving the stated objects and accomplishing the many new functions and results described.

In the foregoing description certain terms have been used for brevity, clearness, and understanding, but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact structures shown which may be varied to provide other structural embodiments without departing from the fundamental principles of the invention.

Having now described the features, discoveries and principles of the invention, the construction, operation and use of preferred forms thereof, and the advantageous, new and useful results obtained thereby; the new and useful discoveries, principles, apparatus, combinations, parts, elements, subcombinations, arrangements, structures, relationships, and constructions, and mechanical equivalents obvious to those skilled in the art are set forth in the appended claims.

I claim:
1. Materials handling positioning stand construction for use with a bottom dump box of a type adapted for storing, transporting and dumping through fork-lift truck operation and having rectangular front, side, and rear enclosure walls formed with a bottom opening closed by a hinged bottom wall and being provided with laterally spaced rear support means and front support means on the bottom wall and with a box hangar on the front enclosure wall; the stand including base and leg members forming frame means; a point-of-use tray front mounted on the frame means; side, rear, and slanting bottom walls forming a hopper open at the top and front and mounted on the frame means with the hopper communicating with the tray front; a cross member mounted at the top of the frame means offset forwardly of the rear hopper wall; spaced support means mounted on the frame means having box-engaging ends located above the tray front and within the confines of the hopper side walls; and the cross member being engaged by and supporting the front box hangar, and the spaced support means being engaged by the box bottom wall rear corners adjacent the spaced rear box support means when a box is deposited by a fork-lift truck on the stand.

2. Materials handling positioning stand construction for use with a bottom dump box of a type adapted for storing, transporting and dumping through fork-lift truck operation and having rectangular front, side, and rear enclosure walls formed with a bottom opening closed by a hinged bottom wall and being provided with laterally spaced rear support means and front support means on the bottom wall and with a box hangar on the front enclosure wall; the stand including connected front and rear corner leg members, base stringer and cross members and vertical leg struts at each side intermediate the front and rear legs forming frame means; a point-of-use tray front member mounted on the frame means extending across the front of the stand between the front corner leg and the leg strut members at either side of the stand; a rear hopper wall mounted on the frame means extending between the rear leg members, a side hopper wall mounted on the frame means extending between the leg strut and rear corner leg members at each side of the stand, and a downwardly forwardly slanting bottom wall extending between the side walls and from the rear wall to the tray front member and forming with said side and rear walls a hopper open at the top and open at the front between the strut leg members; a cross member mounted on and spanning the space between the hopper side walls and offset forwardly of the rear hopper wall; a support member mounted on the inner face of each hopper side wall extending forwardly upwardly of the adjacent leg strut and terminating in a box engaging end located above the tray front; and the cross member being engaged by and supporting the front box hangar, and the box-engaging ends of the support means being engaged by the box bottom wall rear corners adjacent the spaced rear box support means when a box is deposited by a fork-lift truck on the stand.

3. The construction defined in claim 2 in which the hopper side walls extend forward at each side of the stand to the front of the tray front, and in which a barrier member is removably mounted on the tray front extending between extended hopper side walls.

References Cited by the Examiner
UNITED STATES PATENTS

| | | | |
|---|---|---|---|
| 2,690,277 | 9/1954 | Shea et al. | 222—185 |
| 2,780,393 | 2/1957 | Johnson | 222—185 |

HUGO O. SCHULZ, *Primary Examiner.*